INVENTOR.
WALTER F. KOSONOCKY
BY Harry A. Herbert Jr
George Line
ATTORNEYS

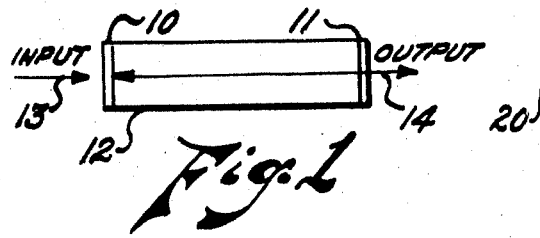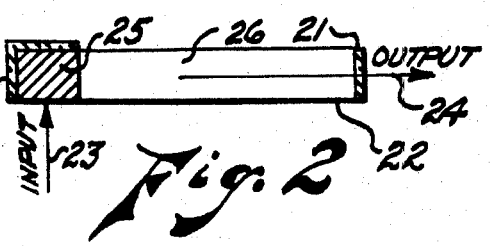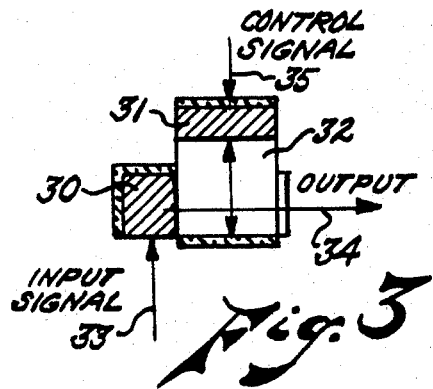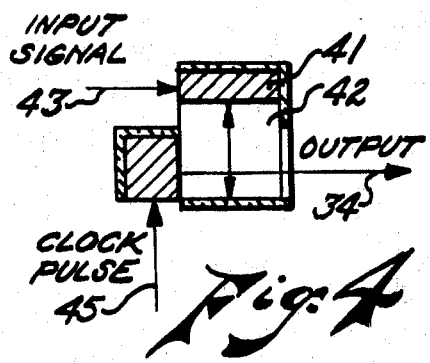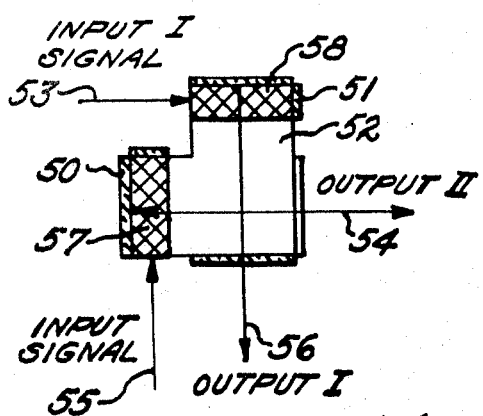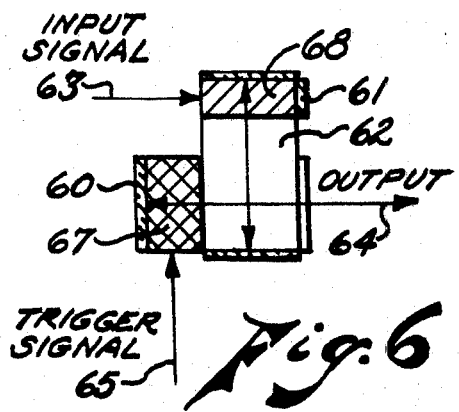

United States Patent Office 3,439,289
Patented Apr. 15, 1969

3,439,289
SEMICONDUCTOR LASER COMPONENTS FOR DIGITAL LOGIC
Walter F. Kosonocky, Iselin, N.J., assignor to the United States of America as represented by the Secretary of the Air Force
Filed July 8, 1965, Ser. No. 470,650
Int. Cl. H01s 3/00; H03k 19/14
U.S. Cl. 331—94.5               1 Claim

ABSTRACT OF THE DISCLOSURE

A laser digital logic apparatus including a first and second cavity resonators sharing a common active laser emissive medium, each of the cavity resonators includes therein a saturable absorber. A first optical input signal to the first cavity resonator provides a steady output therefrom and a second optical input to the second cavity resonator results in a build-up of oscillations therein to permit a switch in the output from the first cavity resonator.

---

This invention relates to semiconductor lasers and particularly to semiconductor lasers utilized as components for digital logic.

Optical digital logic is provided with laser resonators as the only active devices. The resonators in addition to the active laser material contain centers of saturable absorbers. The saturable absorber is capable of being saturated by the light intensities produced by the resonators. This occurs due to the higher strength of interaction (transition probability) of the absorber centers.

The utilization of semiconductor lasers has a considerable advantage because the pumping by current injection is almost 100% efficient, thus lowering the pump power requirements. Also, very high concentration of the emissive population is attainable. An operation well in the kmc range with very small size components is possible. The present pumping rates of 8500 amp./cm.² permit repetition rates in the kmc. range.

It is to be noted that the laser logic devices of the present invention include all of the time varying signals in the form of optical energy. This is particularly desirable when applied to semiconductive lasers, since pumping by current injection can give extremely high repetition rates (at least in the kmc. range) and small size components. The devices are in the form of resonators with threshold provided by saturable absorber centers.

An object of the present invention is to provide semiconductor lasers as components for digital logic.

Another object of the present invention is to provide a semiconductor laser to be utilized as a monostable logic device.

Yet another object of the present invention is to provide a semiconductor laser to be utilized as a bistable logic device.

Figure 7A:
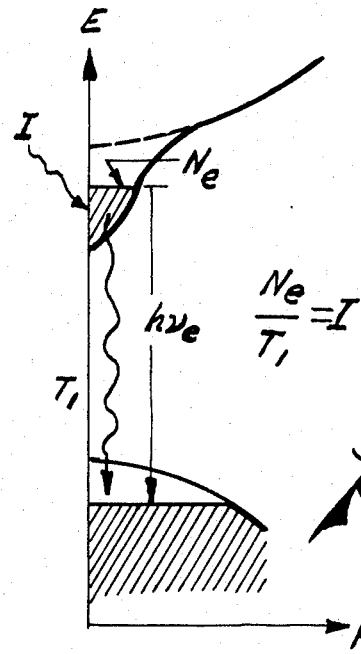
Figure 7B:
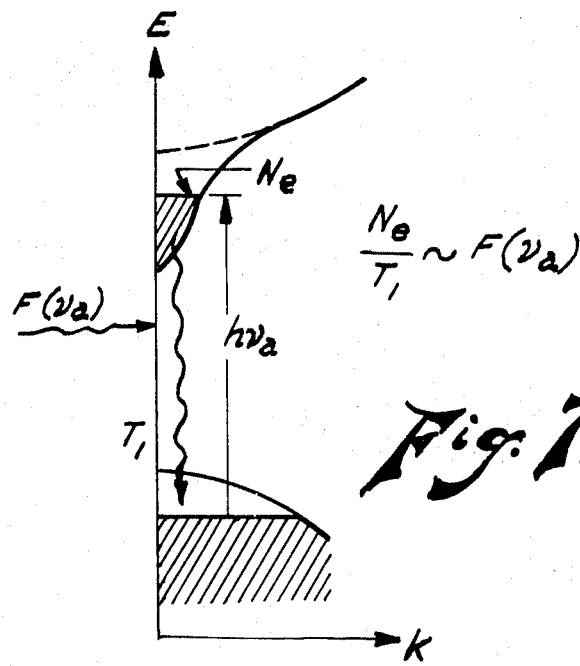

The features of this invention, which are believed to be new, are set forth with particularity in the appended claims. The invention itself, however, together with further objects and advantages thereof may best be understood by reference to the following description when taken in conjunction with the accompanying drawings, in which:

FIGURE 1 shows a single port monostable circuit with saturable absorber centers within the resonator;
FIGURE 2 shows a two port monostable circuit providing isolation between input and output;
FIGURE 3 shows a controlled monostable circuit;
FIGURE 4 shows an inverter circuit;
FIGURE 5 shows a two state circuit;
FIGURE 6 shows a bistable circuit; and
FIGURES 7a and 7b are energy momentum space diagrams.

In FIGURES 1-6 the circuits are described schematically with an understanding that the active emissive region is a p-n junction of the semiconductor laser.

Now referring to FIGURE 1 which is a single port monostable circuit with saturable absorber centers within the resonator. Resonator 12 contains an active emissive population provided by a continuous current injection and a population of saturable absorber centers. The saturable absorber centers are included within the path of the high Q modes of the resonator; they can be lumped or distributed within the resonator. The saturable absorber can be saturated by the light intensities produced by the resonator that is due to the higher transition probability of the absorber centers in comparison to the transition probability of the emissive population. The recovery time of the saturable absorber is shorter than the recovery of the emissive population, i.e. pumping rate. It is to be noted that resonator 12 includes partially transmitting deflectors 10 and 11. The operation of the circuit is described by the following sequence of events.

For low input signals 13 the power absorbed exceeds the emitted power (output) 14; the circuit is stable. If the input signal 13 reaches a level at which the saturable absorber saturates to a point where the emitted power exceeds the absorbed power, the circuit takes off producing a pulse output. The amplitude and shape of the pulse depends on the Q of the circuit and the energy stored in the material. As the saturable absorber has faster recovery time than the emissive population, after a single output pulse the circuit becomes stable with zero output power. Then, the circuit can be triggered by an input pulse producing an output pulse whose shape is independent of the input pulse (provided that the input is not too intense).

A string of such loosely coupled monostable circuits will give an active-slow wave transmission line, which will have a constant pulse shape, constant velocity of propagation and a refractory period following a pulse. The advantage of such slow wave structure in comparison to a continuous transmission medium for neuristor logic is in a reduction in length of a line for a given available pumping rate. This becomes evident when one considers that saturation of the emissive population requires certain energy in the propagating pulse. Then, if the effective velocity of the propagating pulse is lower, this pulse can be confined to a shorter length of the line. The minimum length for a neuristor logic element must be greater than the refractory period of the line which in turn is directly related to the pumping rate.

Now referring to FIGURE 2, this circuit may be utilized for laser logic and is called a two-port monostable circuit. There is shown resonator 22 having active region 26 and saturable absorber region 25. There is also provided totally reflecting surface 20 and partially transmitting reflector 21. The saturable absorber of circuit on FIGURE 2 can be acted on by input signal 23 that cannot be coupled directly to the high Q modes of the resonator. As the input saturates the absorber centers, a large output is produced (similar in operation to Q-switched laser). Then, if the absorber recovers before the emissive population is replenished, the circuit will become stable after producing a single output pulse. A very important feature of this circuit is the isolation between the input and output. This being a monostable threshold circuit, it can be used as an OR gate or even as an AND gate.

Referring to FIGURE 3 which is a controlled monostable circuit, there is shown active emissive region 32 which is shared by two independent resonators 30 and 31. The input-output relation of this circuit is similar to the circuit of FIGURE 2 except that the active emissive region is shared by two independent resonators. Control signal 35, that normally precedes input signal 33, triggers its own resonator, thus exhausting the emissive population. An input signal then would not produce any output when the circuit is in the refractory (recovery) period for the emissive population. In other words, the operation of the monostable threshold circuit can be inhibited by a control pulse.

The circuit of FIGURE 4 is almost identical to that of FIGURE 3 except that by replacing the input by clock pulse 45 and the control signal by input signal 43, an inverting circuit is obtained. The output 34 is an inverse of the applied input, thus producing an inverting threshold gate.

All the above circuits are monostable circuits. Their stable state produce no output. It was shown that the OR-function and the negation function can be realized with these circuits. Therefore, in conjunction with dynamic storage functions (composed of strings of monostable circuits or possibly including a delay line) the above circuits are sufficient for digital logic. However, an addition of bistable circuits can considerably increase the flexibility of logic design.

A bistable-two state circuit is shown in FIGURE 5, it contains two resonators 50 and 51 both of which are sharing common active region 52 and have individual saturable absorbers 57 and 58. The saturable absorbers, however, have longer recovery times than the recovery of the active emissive population. The result is that if the absorber is saturated by an input pulse a corresponding resonator would take off producing a steady output and also maintaining its own absorber saturated. Then an input signal incident on the second absorber will saturate it, thus permitting a build up of oscillations of the second resonator. The active region not shared by both resonators will provide gain for switching between states. As a result the output will be switched from I to II.

FIGURE 6 illustrates a bistable circuit. Pair of resonators 60 and 61 are shown sharing emissive region 62. One of the resonators is used to produce a bistable output that can be triggered on by trigger signal 65. The other resonator is a monostable circuit which by building up its own resonant modes can quench out the bistable resonator. The circuits of FIGURES 5 and 6 can be used as conventional binary circuits producing step control signals for the monostable circuits previously described.

It is to be noted that the saturable absorbers utilized in FIGURES 1–6 have not been previously discussed in detail so that the following description amplifies thereupon.

It is generally accepted that the power flux densities produced within most (efficient) laser oscillators are sufficiently high to result in a saturation of the stimulated emission. The stimulated emission will be saturated if it dominates over the spontaneous emission process in controlling the level of inverted population in the laser material. Excluding a difference in degeneracies in the two considered energy states, the stimulated emission and absorption coefficients, $B_{21}$ and $B_{12}$, are identical. Therefore, it can be expected that the power flux densities produced by the laser sources should be capable of saturating the absorption lines, or bands, of similar species provided that their resonant frequencies coincide. It is known that the absorption cross section of the similar species may vary over two orders of magnitude. For example the absorption cross section of several impurities in $G_e$ and $S_i$ vary between $10^{-17}$ to $10^{-15}$ cm.$^2$.

One of the most logical choices for saturable absorber material for semi-conductor lasers is to use the transitions associated with impurity bands in the same or similar semi-conductor material.

It could be inferred from recent measurements obtained at RCA Laboratories on the current induced, frequency shifts of light emitted from gallium arsenide diodes that impurity band edge absorption can be used as the mechanism for achieving saturable absorption. An explanation for the current-induced frequency shifts in the luminescence of GaAs diodes is that an impurity band is gradually filled up by injected minority carriers. This concept suggests that the impurity band could act as a saturable absorber to an intense optical signal (see FIGURES 7a and 7b). The mechanism of the impurity band filling is sketched in FIGURE 7a. This sketch pictorially shows that an increase in the diode current is accompanied by a net shift of the peak emission frequency to a higher value. The same diode should act as a saturable absorber to an optical signal, as shown in FIGURE 7b. The operation of this absorber should resemble the three-level absorption process. The saturation occurs when the impurity band is filled up to the energy level corresponding to the frequency of the input signal. The diode current could exercise an additional control over the absorption process. A forward-bias junction should tend to saturate the absorption. The back-bias junction would be more difficult to saturate. It is expected that the diodes that exhibit strong frequency shifts will also be very easy to saturate. It should also be noted that the junction is not necessary for saturable material. An appropriately doped bulk GaAs semiconductor could also be used as the saturable absorber.

It is to be noted that the integration of the emissive material and saturable absorber material in one laser resonator can be visualized in two following ways:

(1) The emissive and saturable absorptive materials are separate parts and are only optically coupled together. Each part is coated with an anti-reflective coating for the laser frequency. External mirrors are used or the laser cavity is formed by reflective coatings on the outside walls of these parts.

(2) Both the emissive and the saturable absorptive material are parts of the same semiconductor chip. Two of the external surfaces serve as the reflectors. If the saturable absorber is in the form of a junction, it must be electrically isolated from the laser pump current. Selective doping of each of the two regions can be obtained by appropriate masking of these regions during the impurity diffusion process.

What I claim is:

1. A laser digital logic device comprising a first cavity resonator formed by a first pair of reflectors, a second cavity resonator formed by a second pair of reflectors, a common active laser emissive medium shared and positioned in said first and second cavity resonators, a first saturable absorber positioned in said first cavity resonator adjacent to one of said first pair of reflectors, a second saturable absorber positioned in said second cavity resonator adjacent to one of said second pair of reflectors, said first and second absorbers having longer recovery times than the recovery time of the active emissive population of said common active emissive medium, means to saturate said first absorber with a first optical input signal wherein said first resonator produces a steady output therefrom while maintaining the saturation of said first absorber, means to apply a second optical input signal to said second absorber for saturation thereof to permit a build-up of oscillation in said second resonator, and output means for said laser digital logic device including the other of said first pair of reflectors.

References Cited

UNITED STATES PATENTS 3,270,291   8/1966   Rosonocky _____ 331—94.5

OTHER REFERENCES

Koester et al.: Symposium on Optical and Electro-optical Information Processing, Boston, November 1964, p. 266.

JEWELL H. PEDERSEN, *Primary Examiner.*

E. BAUER, *Assistant Examiner.*

U.S. Cl. X.R.

307—312